July 28, 1959
G. M. STAMPS
2,896,501
APPARATUS FOR OUTLINING CONTOURS
Filed May 28, 1953
3 Sheets-Sheet 1
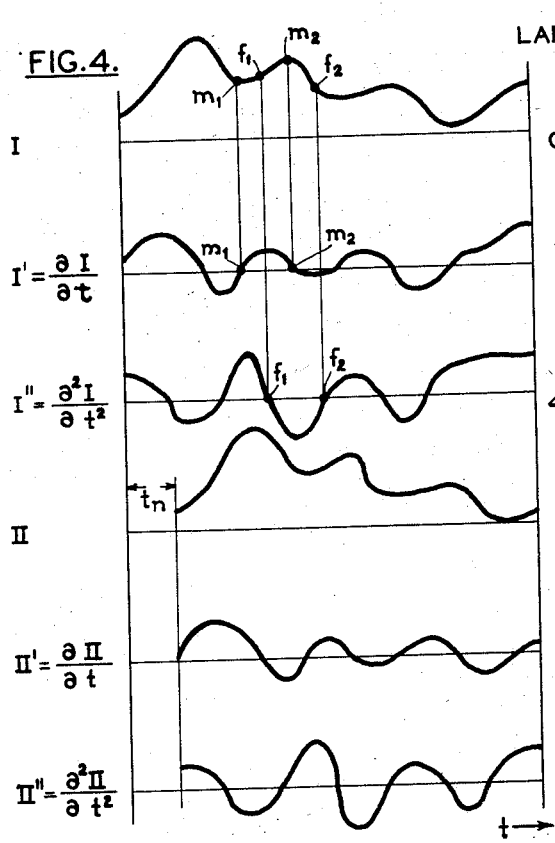
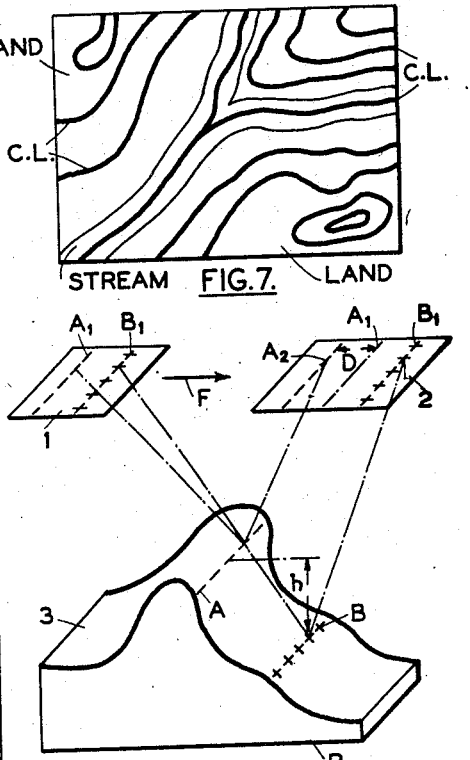
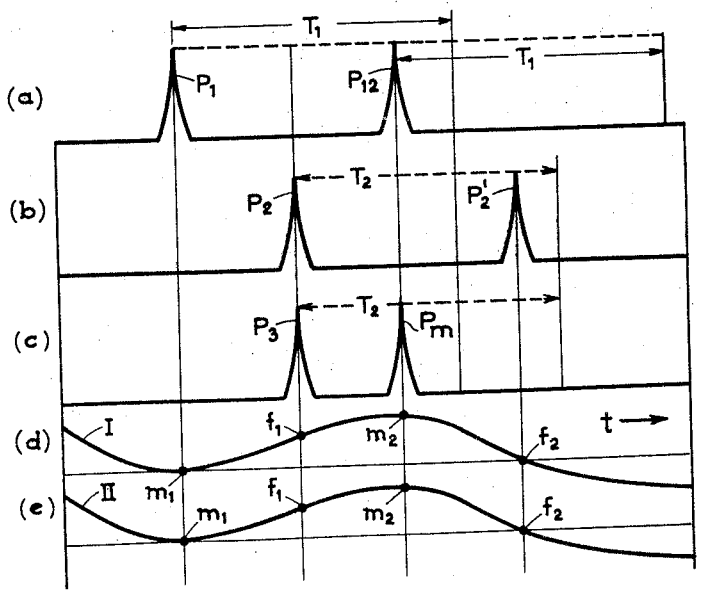
INVENTOR.
GEORGE M. STAMPS
BY J. B. Burke
ATTORNEY July 28, 1959 G. M. STAMPS 2,896,501
APPARATUS FOR OUTLINING CONTOURS
Filed May 28, 1953 3 Sheets-Sheet 2

INVENTOR.
GEORGE M. STAMPS
BY J. B. Burke
ATTORNEY

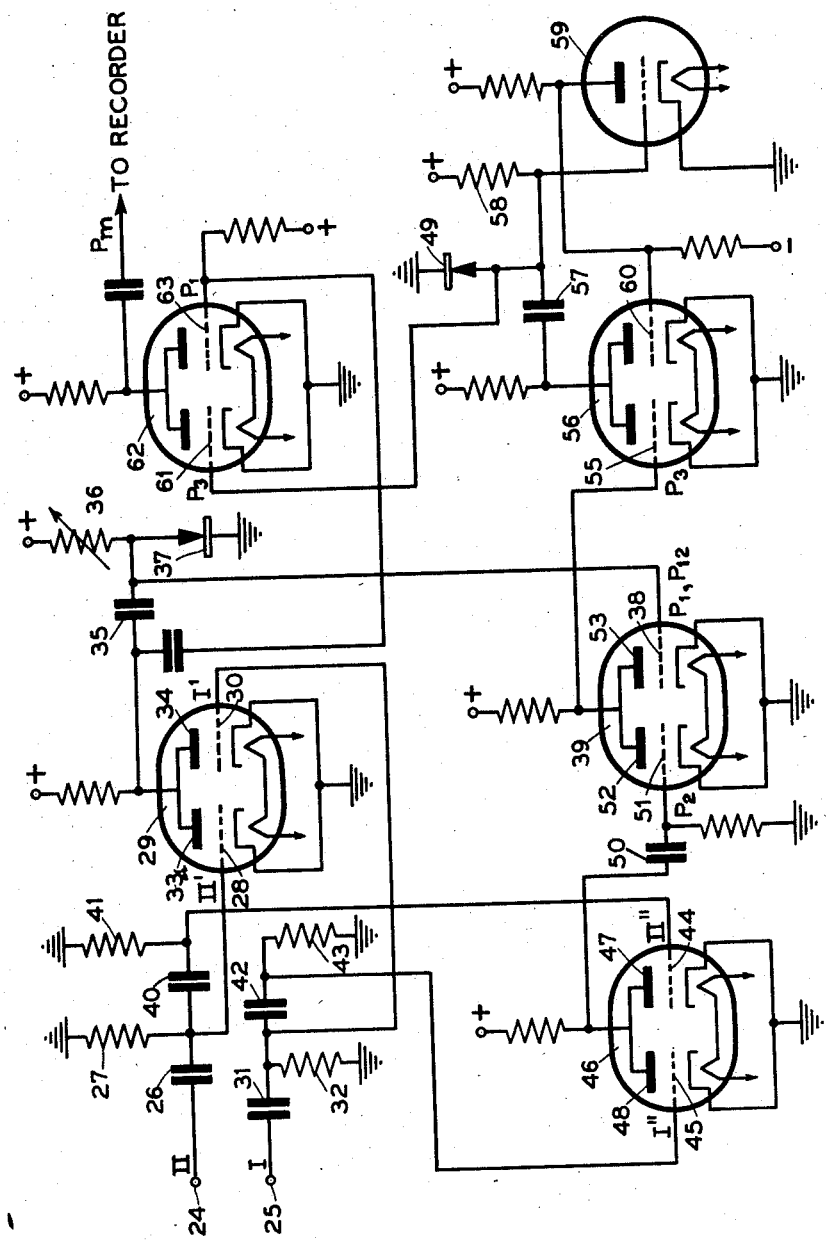

2,896,501

APPARATUS FOR OUTLINING CONTOURS

George M. Stamps, New Hyde Park, N.Y., assignor to Faximile, Inc., New York, N.Y., a corporation of Delaware Application May 28, 1953, Serial No. 358,113

14 Claims. (Cl. 88—14)

This invention relates to the art of defining contours of elevation from stereoscopic photographs or other stereoscopic representations of a terrain.

A principal object of the invention is to provide an apparatus for automatically producing from a pair of stereoscopic representations of a terrain, a graphic representation of the contours at various elevations of the terrain.

A further object is to provide an apparatus for automatically scanning a pair of stereoscopic representations of a terrain and automatically producing a graphic representation of the terrain with contour lines indicative of various elevations outlined thereon.

A further object is to provide a photogrammetric apparatus in which the entire scanning, analyzing and plotting operations are automatic and require no manual operations after the initial adjustment of the apparatus.

It is a further object to provide an apparatus for scanning two aerial photographs electro-optically to determine terrain elevations from phase differences between the output signals of two scanners, and to print a recording of one of the photographs with contour lines representing equal phase differences outlined thereon, the contour lines being calibrated in terms of terrain elevations.

The present invention provides for directly scanning respectively two stereoscopic photographs of a terrain by two electro-optical scanners to produce two separate series of electrical pulses. The pulses of both series are compared to determine instants of coincident phase. At these instants pulses are generated which are transmitted to a facsimile recorder, such as one of the type disclosed in patent to Hogan et al., 2,202,855. This type of recorder produces a graphic record directly on electrosensitive paper from suitable received electrical pulses. The resulting record is an outline of a contour of predetermined elevation of the terrain. The invention also provides for transmitting the pulses of one of the series produced by the scanners to the recorder. The resulting graphic record is a true pictorial representation of the terrain with a contour line of predetermined elevation outlined thereon. To obtain a representation of plural contour lines on a picture of the terrain, the pulses of one of the series produced by one scanner are transmitted through a plurality of delay circuits, so arranged that each circuit delays the pulses a different predetermined time interval to produce a plurality of trains of delayed pulses. The trains of delayed pulses are compared with the series of pulses produced by the other scanner and pulses are generated at instants of coincident phase. The generated pulses and series of pulses produced by the other scanner are also transmitted to a facsimile recorder. The final facsimile record is a graphic representation of the terrain with a plurality of contour lines representative of predetermined elevations outlined thereon.

The invention may be best understood from the following description, taken together with the drawings, wherein:

Fig. 1 is a drawing illustrating the geometrical principles upon which the invention is based.

Fig. 4 is a representation of wave forms used to explain the operation of a pulse comparator employed in the invention.

Fig. 5 is a representation of pulse forms used to explain the operation of a pulse comparator employed in the invention.

Fig. 6 is a schematic diagram of a phase comparator circuit.

Fig. 7 is a graphic representation of a terrain with contour lines outline thereon as produced in accordance with the invention.

In Fig. 1, picture 1 represents a photograph taken from an airplane at a first position in the line of flight F, of an area of terrain on the ground 3. Picture 2 represents another photograph taken from the same airplane at a second position in the line of flight. Both pictures show images $B_1$ and $B_2$ of the line B which is a line located at a particular elevation of the ground 3. If pictures 1 and 2 are aligned so that the lines $B_1$ and $B_2$ on pictures 1 and 2 are superimposed, then lines $A_1$ and $A_2$ representing another line A at a particular elevation of the ground 3 will also be superimposed if lines A and B are at the same ground elevation. Lines A and B are at different ground elevations as shown in Fig. 1, and are separated by a vertical distance $h$. If corresponding lines $B_1$ and $B_2$ are superimposed, corresponding lines $A_1$ and $A_2$ will fail of superposition by a distance D. This distance D is a simple trigonometric function of $h$, the difference in elevation between lines A and B.

Figure 2:
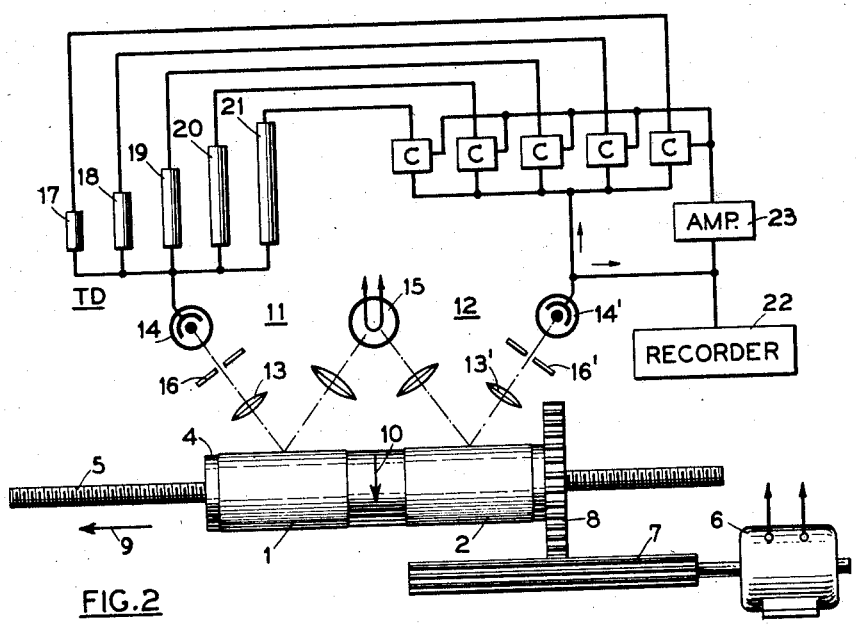
Fig. 2 is a schematic diagram of one embodiment of the invention.

In Fig. 2, the aerial photographs 1 and 2 are oriented in planes parallel to each other. They are mounted on a cylindrical drum 4 which is turned at a uniform rate on the stationary threaded shaft 5. As the drum is rotated by motor 6 through gears 7, 8 it is advanced axially in the direction 9. The placement of photographs 1, 2 is such that the circumferential direction of rotation 10 corresponds to the direction of flight of the airplane from which the photographs were successively taken. The photograph are simultaneously scanned by the electro-optical scanners 11, 12 each of which consists of the lenses 13, 13', apertured plates 16, 16', and photoelectric cells 14, 14'. A suitable light source 15 is provided for use by both scanners. Each scanner produces a series of electrical pulses. The wave form of the series of pulses produced by each scanner will be similar except that there will be a time difference $t_n$ (Fig. 4) between pulses of the two series representing corresponding points on photographs 1, 2. This time difference is proportional to the distance D of Fig. 1. Since the distance D is proportional to the difference in elevation $h$, the time difference is proportional to $h$. The pulses from scanner 11 are fed to a plurality of time delay circuits TD arranged in parallel. The pulses in delay circuit 17 are delayed a predetermined time $t$. Delay circuit 18 delays the pulses for time interval $2t$. Delay circuits 19, 20, 21 delay the pulses time intervals $3t$, $4t$, $5t$, respectively. The several delay circuits may be electro-acoustic delay lines of types well known in the art. The particular number of delay circuits to be employed will depend on the number of contours of elevation to be outlined, one delay circuit being provided for each contour line. The pulse trains are separately compared with the original series of pulses from scanner 12 in the comparators C connected to the delay circuits 17—21. Whenever the pulse train output of one of delay circuits TD is in phase with the series of pulses from scanner 12 the corresponding regions of terrain which were scanned simultaneously on the two photographs 1, 2 are the predetermined distance D apart on the photographs, and the elevation of the scanned region of terrain on photograph 1 is distance $h$ above an arbitrary reference datum plane P (Fig. 1). When the output of delay circuits 17—21 respectively coincide in phase with the series of pulses from scanner 12, the regions of terrain being scanned on photograph 1 are respectively $h$, $2h$, $3h$, $4h$ and $5h$ above the reference datum plane. It is of course desirable that the reference datum plane P be fixed at a level not exceeding the lowest elevation of terrain to be explored. The distance $h$ should represent the desired difference in elevation between the contours to be determined. Each of comparators C is arranged to generate a marking pip signal at the instant of coincidence of phase of each delayed train of pulses with the original series of pulses produced by scanner 12. These pip signals are transmitted to a facsimile recorder 22 via D.-C. amplifier 23 which amplifies the signals to an amplitude sufficient to cause full black marks to be recorded on the electrosensitive paper of the recorder 22. The comparators produce a marking pip signal whenever the compared pulses coincide in phase or are within a fixed limit of coincidence. Each marking pip signal represents a region of terrain scanned having an elevational $Nh$ where N is some integer. The marking pip signals produce a continuous succession of marks on the graphic record forming a continuous line. This line represents the locus of all points having equal time delay between the series of pulses from scanners 11 and 12 and indicates a single contour line of the terrain pictured on the photographs. Complete recording of all marking signals representing all instants of coincidence in phase of the compared signals results in a recorded outline of all the desired contours. Scanner 12 is also connected directly to recorder 22 so that during the single scanning of photographs 1, 2 a complete graphic reproduction of the photograph of the terrain is produced by the recorder with the control lines outlined in full black on the picture of the terrain. In Fig. 7 is shown a graphic representation of a terrain such as would be produced in accordance with the invention. The picture shows a stream at the lowest level of elevation and land masses on both sides of the stream. Continuous contour lines C.L. are outlined on the picture of the terrain. Each contour line represents a horizontal level of different elevation.

Comparators C consist of a plurality of similar circuits. One form of comparator C is shown schematically in Fig. 6. In order to explain the arrangement of the circuit of Fig. 6 reference will first be made to Figs. 4 and 5.

In general for a recurrent continuous wave form there will be in each cycle in succession a point of minimum amplitude, a point of inflection and a point of maximum amplitude as shown at $m_1$, $f_1$ and $m_2$ respectively of waveform I in Fig. 4. Thus in sequence the slope of the curve is zero at minimum amplitude, the derivative of the slope is zero at the point of inflection, and the slope is zero again at maximum amplitude. These zero values are shown respectively at $m_1$, $f_1$ and $m_2$ on curves I' and I" which represent the first and second derivatives respectively of curve I. In order to determine the condition of phase coincidence in any cycle of two curves of known similar waveform it is necessary that the three points mentioned above substantially coincide respectively in the two curves. In Fig. 4, waveform I is a signal wave shape as may be derived from scanner 12 of Fig. 2 and waveform II is a correspondingly shaped curve differing in phase by a predetermined time $t_n$ as derived from scanner 11. If each waveform is differentiated in a suitable circuit, waveforms I' and II' will be produced. Waveforms I" and II" are the curves derived by differentiating curves I' and II'.

In Fig. 5 curves (d) and (e) represent corresponding portions of curves I and II on an enlarged scale with points $m_1$, $f_1$ and $m_2$ indicated. The points $f_2$ are points of inflection following the maximum amplitudes $m_2$. The curves (d) and (e) are similar in shape and correspond in time because curve (e) represents waveform II delayed a predetermined time in one of delay circuits 17—21. The waveforms are shown in Fig. 5 as they would be applied to a comparator C to be described below. In this comparator waveforms I and II are both differentiated to produce waveforms, I' and II' respectively. Waveforms I' and II', are then applied to a coincidence circuit. If zero values of I', II' representing minimum amplitudes $m_1$ of waveforms I and II occur simultaneously or within a predetermined limit of time difference a pulse $P_1$ is generated as in curve (a) and stretched a time $T_1$. The waveforms I' and II' are also differentiated to produce waveforms I" and II" which are also applied to a coincidence circuit. When zero values of I" and II" representing points of inflection $f_1$ on waveforms I and II occur simultaneously, pulse $P_2$ is generated as in curve (b). Any subsequent simultaneous occurrence of zero values of I' and II" during time $T_1$ causes generation of pulse $P_{12}$ and starts a new period of pulse extension $T_1$. Extended or stretched pulse $P_1$ is compared with pulse $P_2$ for coincidence. When such coincidence occurs, pulse $P_3$ is generated as shown in curve (c). Pulse $P_3$ is extended in time or stretched a predetermined time $T_2$. Should a second coincidence of zero values of waveworms I" and II", representing coincidence of points of inflection $f_2$ of waveforms I and II, occur during time $T_2$ to produce pulse $P_2'$, no extension of pulse $P_3$ beyond time $T_2$ occurs and pulse $P_2'$ is suppressed. Pulse $P_3$ as extended or stretched is then compared with stretched pulses $P_1$, $P_{12}$. If coincidence of the stretch pulse $P_3$ with stretched pulses $P_1$, $P_{12}$ occurs during $T_2$ a marking pulse $P_m$ is generated to signify coincidence in phase of the waveforms I and II. The basis for determining coincidence of phase of the waveforms I and II is thus dependent on determining instants of coincidence in succession of minimum amplitudes, points of inflection and maximum amplitudes of the waveforms, in the order stated.

The circuit of Fig. 6 illustrates one embodiment of a means for accomplishing waveform phase comparison in accordance with the invention. In Fig. 6 input terminal 24 is connected to one of delay lines 17—21. Another input terminal 25 is connected to the output of scanner 12. Waveform I is applied to terminal 25 and waveform II is applied to terminal 24. A differentiator circuit consisting of capacitor 26 and resistor 27 is connected to input terminal 24. Grid 28 of tube 29 receives a differentiated signal waveform II' from the differentiator 26—27. Grid 20 of tube 29 likewise receives a differentiated signal I' from capacitor 31 and resistor 32 connected to the input terminal 25. Tube 29 is operated in a coincidence circuit. When the signals on grids 28 and 30 are both zero simultaneously the plates 33, 34 conduct a pulse current which is extended in time or "stretched" a predetermined amount $T_1$ by a stretcher circuit consisting of capacitor 35, resistor 36 and rectifier 37. This stretched pulse is shown as $P_1$ in Fig. 5. When a subsequent pulse $P_{12}$ is generated in tube 29 during the initial stretch period $T_1$ a new period of pulse extension $T_1$ is begun.

Grid 38 of tube 39 receives the extended pulse $P_1$, $P_{12}$ from stretcher circuit 35—37. The differentiated output I', II' of differentiator circuits 26—27 and 31—32 are connected also to further differentiators consisting respectively of capacitor 40-resistor 41 and capacitor 42-resistor 43. The grids 44 and 45 of tube 46 receive pulses II", I" from differentiators 40—41 and 42—43. Tube 46 operates as a coincidence tube and conducts pulses $P_2$ through plates 47, 48 via capacitor 50 to grid 51 of tube 39 when both pulses II", I" on grids 44 and 45 are simultaneously zero. When pulses $P_1$—$P_{12}$ and $P_2$ appear on both grids 38 and 51 simultaneously a pulse current $P_3$ is passed via plates 52, 53 and capacitor 54 to grid 55 of tube 56. When pulse $P_3$ is applied to grid 55, a pulse appears in the output circuit of tube 56. The output circuit is arranged to extend the duration of this pulse a predetermined time $T_2$. This is done by a stretcher circuit consisting of capacitor 57, resistor 58 and rectifier 49. The stretched pulse $P_3$ is applied via tube 59 to the grid 60 of tube 56. By this arrangement once a pulse $P_3$ is initiated in the output of tube 56 the time duration $T_2$ of the pulse cannot be changed by a subsequent pulse $P_2'$ applied to grid 51 during time duration $T_2$. This arrangement contrasts with the output circuit of tube 29 in which a pulse $P_1$ is extended a predetermined time $T_1$ by stretcher 35—37 but a new pulse period $T_1$ is initiated by a subsequent pulse $P_{12}$.

The output of tube 56, representing stretched pulse $P_3$ is delivered to grid 61 of tube 62. Tube 62 is disposed in a coincidence circuit. To the other grid 63 of tube 62 is applied pulse $P_1$ as extended by the stretcher circuit 35—37. If pulses $P_1$ and $P_3$ are coincident a marking pulse $P_m$ is generated in tube 62 and is applied to recorder 22 via amplifier 23 (Fig. 2).

In the arrangement of Fig. 2 as many individual comparator circuits C as shown in Fig. 6 are required as there are delay lines and individual contour lines to be outlined. It is possible to simplify the apparatus of Fig. 2 by omitting all comparator circuits C but one. In such an arrangement it would be necessary to scan the two photographs a number of times equal to the number of contours to be outlined. The recording of the entire picture of the terrain would be done during one of the scans. During each scan of the photographs only one delay line would be connected to the comparator together with the output of scanner 12. A simple multi-contact switch could be provided to connect the delay lines in succession to the comparator. Switching can be arranged to be automatic so that the entire scanning and recording procedure would likewise be automatic. Of course the time taken for successive scans of the photographs would prolong the entire precedure considerably.

Figure 3:
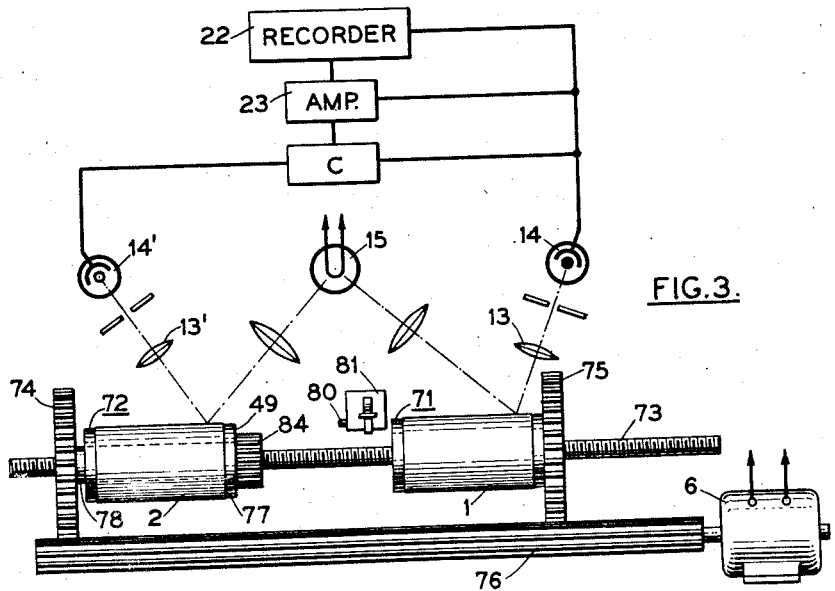
Fig. 3 is a schematic diagram of a modification of the invention.
Figure 3A:
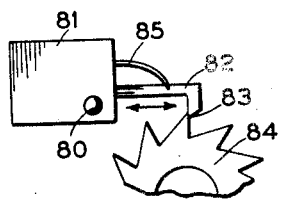
Fig. 3A is a fragmentary side view of a portion of the apparatus of Fig. 3.

In Fig. 3 is shown an arrangement of the apparatus which makes it possible to employ only one comparator circuit and eliminate all the delay circuits previously shown in Fig. 2. In this embodiment of the invention repeated scans of the two stereoscopic photographs are required. In this arrangement two drums 71 and 72 are employed on which are placed the photographs 1, 2. Drums 71 and 72 rotate on threaded stationary shaft 73 and are driven by motor 6 via gears 74, 75, 76. Drum 72 consists of two parts, an outer cylindrical sleeve 77 and an inner threaded cylinder 78. Gear 74 is attached rigidly to inner cylinder 78 but is not attached to outer cylinder 77. Cylinder 77 is frictionally fitted to cylinder 78 so that both cylinders rotate as a unit during each scanning cycle. Cylinder 77 is also rotatable with respect to cylinder 78 between scanning cycles. At the end of each scanning, drums 71 and 72 are returned to their initial scanning position, for example by automatically reversing the direction of rotation of motor 6. When the initial scanning position is reached, cylinder 77 contacts and closes switch 80 of the electromagnet 81. Electromagnet 81 is provided with a plunger 82 having a hooked end 83 as shown in Fig. 3A. The hooked end 83 engages one tooth of gear 84, which is attached only to cylinder 77, and rotates cylinder 77 with respect to cylinder 78 a distance proportionately related to the distance between successive contours to be outlined. Spring 85 then returns plunger 82 to the original extended position. The limited successive advance of the cylinder 77 with respect to cylinder 78 takes place at the beginning of each scanning cycle. Photograph 2 is mounted on cylinder 77 and advances with it. The successive advance by discrete predetermined distances of photograph 2 with respect to photograph 1 is equivalent to delaying in time the scanning pulses from photograph 2 by progressively increased discrete amounts. The separate series of scanning pulses from scanners 11, 12 are compared in a single comparator C and marking signals are generated at instants of coincidence in phase as described for the apparatus of Fig. 2. The final record is that of a picture of the terrain with plural contours outlined thereon.

In order to employ the apparatus of Figs. 2 and 3 it is necessary to insure that the photographs 1 and 2 be similarly oriented and parallel to the same reference datum plane of the terrain. If the camera taking the successive stereoscopic photographs is gyro-stabilized to take pictures oriented in a horizontal plane in a manner known in the art, then no compensation for tilt is required. If the plane of orientation of one photograph is tilted with respect to the other and even if both photographs are tilted differently from the reference datum plane, it is possible to remedy the tilt error or errors by reprinting the negatives of the photogaphs on to positives oriented in the desired datum plane. The negatives should be placed in a suitable enlarging or projecting device with the negative tilted to the plane in which it lay while in the aerial camera, and the optical axis of the lens of the enlarger or projector should be parallel to the optic axis of the aerial camera at the instant the picture was taken. In this way two new stereoscopic photographs will be obtained which are properly oriented.

In the embodiments shown in Figs. 2 and 3 the photographs are mounted on one or two cylindrical drums. It is also possible to arrange the photographs to be scanned separately in flat or substantially flat positions. The photographs would be moved simultaneously past parallel scanning lines in coordination with movement of the electro-optical scanning elements. Scanners suitable for this purpose are shown in my copending application 291,144 filed June 2, 1952, and in patent to Hogan 2,379,438.

Although the present invention has been described in terms of stereoscopic photographs, it is contemplated that other stereoscopic representations of terrain might be used such as stereoscopic images of a terrain on the screens of two cathode ray storage tubes of a suitable television or radar receiver system. It will be noted that the systems of Figs. 2 and 3 are so arranged that once the properly oriented stereoscopic photographs are mounted in scanning position and the apparatus set in operation, the entire scanning and plotting operation of all desired contours is automatic with the additional advantage that the final record includes a reproduction of an image of the terrain with the contours outlined thereon. The graphic record produced by the facsimile recorder 22 appears directly on electrosensitive paper and no further processing of the record is necessary. It is possible to use a facsimile recorder of the type which produces a record on photosensitive photographic film instead of a direct record. The film record will of course require photographic processing to obtain the final positive print showing the terrain with contours outlined thereon.

I claim:

1. A system for outlining contours of a terrain comprising a pair of electro-optical scanners for producing two series of electrical pulses from a pair of stereoscopic photographs, means for dividing one series of pulses into plural trains of pulses, means for delaying the phase of each train a different predetermined time interval, means for comparing the phase of each train of pulses with the other series of pulses and for generating pulses only at instants of coincident phase of the compared pulses, and a recorder for recording the other series of pulses and the generated pulses as a graphic representation of the terrain with at least one contour line outlined thereon, said means for comparing the phases of the said trains of pulses comprising a circuit for successively comparing instants of coincidence of waveforms representing the first derivatives of said trains of pulses.

2. A system in accordance with claim 1 wherein said circuit includes means for comparing waveforms representing the second derivatives of said trains of pulses.

3. In a photogrammetric apparatus, in combination: photoelectric means for simultaneously scanning two stereoscopic representations of a terrain to produce two cyclical waveforms, means for comparing said waveforms and producing a marking pulse each time successive points of minimum amplitude, inflection and maximum amplitude in one cycle of both waveforms are coincident, and means for simultaneously recording one of said waveforms and the marking pulses to produce a graphic representation of said terrain with a contour line outlined on said graphic representation.

4. In a photogrammatric apparatus, in combination: photoelectric means for simultaneously scanning two stereoscopic representations of a terrain to produce two cyclical waveforms, means for delaying one of said waveforms in time with respect to the other waveform, means for comparing the delayed waveform with the other and producing a marking pulse each time successive points of minimum amplitude, inflection and maximum amplitude in one cycle of both compared waveforms are coincident, and means for simultaneously recording either of said cyclical waveforms and the marking pulses to produce a graphic representation of said terrain with a contour line outlined on said graphic representation.

5. In a photogrammetic apparatus, in combination: photoelectric means for simultaneously scanning two stereoscopic representations of a terrain to produce two cyclical waveforms, means for differentiating the two waveforms, means for comparing the differentiated waveforms and producing a first pulse when zero amplitude of the differentiated waveforms occur simultaneously and producing a second pulse when zero amplitudes of the differentiated waveforms next occur simultaneously, means for differentiating the differentiated waveforms to produce two other waveforms representing second derivatives of the first named waveforms, means for comparing the two other waveforms and producing a third pulse when zero amplitudes of said other waveforms occur simultaneously, means for comparing the first, second and third pulses for coincidence, and means for generating a marking pulse when said first, second and third pulses occur simultaneously, said marking pulse indicating that successive points of minimum amplitude, inflection and maximum amplitude in one cycle of both waveforms are coincident.

6. In a photogrammetric apparatus in combination: means for determining a condition of phase coincidence of two waveforms, comprising means for differentiating the two waveforms, means for comparing the differentiated waveforms and producing a first pulse when zero amplitudes of the differentiated waveforms occur simultaneously and producing a second pulse when zero amplitudes of the differentiated waveforms next occur simultaneously, means for differentiating the differentiated waveforms to produce two other waveforms representing second derivatives of the first named waveforms, means for comparing the two other waveforms and producing a third pulse when zero amplitude of said other waveforms occur simultaneously, means for comparing the first, second and third pulses for coincidence, and means for generating a marking pulse when said first, second and third pulses occur simultaneously, said marking pulse indicating that successive points of minimum amplitude, inflection and maximum amplitude in one cycle of both waveforms are coincident.

7. In a photogrammetric apparatus for producing a graphic representation of a terrain with a plurality of spaced contour lines marked thereon, in combination: photoelectric means for simultaneously scanning two stereoscopic representations of said terrain to produce two cyclical waveforms, means for delaying one of said waveforms to produce a plurality of delayed waveforms, means for comparing the respective delayed waveforms with the other of said cyclical waveforms and producing a plurality of series of marking pulses, one of said marking pulses being produced each time successive points of minimum amplitude, inflection and maximum amplitude in one cycle of one delayed waveform and said other cyclical waveform are in coincidence, and means for recording said other cyclical waveform and said plurality of series of marking pulses to produce said graphic representation of the terrain with said spaced contour lines marked thereon.

8. In a photogrammetric apparatus for producing a graphic representation of a terrain with a plurality of spaced contour lines marked thereon, in combination: photoelectric means for simultaneously scanning two stereoscopic representations of said terrain to produce two cyclical waveforms, means for delaying one of said waveforms to produce simultaneously a plurality of delayed waveforms, means for simultaneously comparing the respective delayed waveforms with the other of said cylical waveforms and producing a plurality of series of marking pulses, one of said marking pulses being produced each time successive points of minimum amplitude, inflection and maximum amplitude in one cycle of one delayed waveform and said other cyclical waveform are coincident, means for simultaneously recording said other cyclical waveform and said plurality of series of marking pulses to produce said graphic representation of the terrain with said spaced contour lines marked thereon.

9. In a photogrammetric apparatus for producing a graphic representation of a terrain with a plurality of spaced contour lines marked thereon, in combination: photoelectric means for simultaneously scanning two stereoscopic representations of said terrain to produce two cyclical waveforms, means for delaying one of said waveforms to produce simultaneously a plurality of delayed waveforms, means for differentiating the delayed waveforms and the other of said cylical waveforms, means for simultaneously comparing each differentiated delayed waveform with the differentiated other cyclical waveform and producing a first pulse when zero amplitudes of the compared differentiated waveforms occur simultaneously and producing a second pulse when zero amplitudes of the compared differentiated waveforms next occur simultaneously, means for differentiating each differentiated delayed waveform and said other cyclical waveform to produce second derivative waveforms, means for comparing the second derivative waveforms of said delayed waveform and said other cyclical waveforms to produce a third pulse when zero amplitudes of the second derivative waveforms occur simultaneously, means for comparing the first, second, and third pulses for coincidence, means for generating a marking pulse each time said first, second, and third pulses occur simultaneously during a single cycle of said other cyclical waveform, and means for simultaneously recording said other cyclical waveform and the marking pulses to produce said graphic representation of said terrain with said spaced contour lines outlined on said graphic representation.

10. The combination according to claim 9, wherein the delay means for the one cyclical waveform is a plurality of mutually independent delay lines.

11. In a photogrammetric apparatus for producing a graphic representation of a terrain with a plurality of spaced contour lines marked thereon, in combination: photoelectric means for simultaneously scanning two stereoscopic representations of said terrain to produce two cyclical waveforms, means for delaying one of said waveforms to produce a plurality of delayed waveforms, means for differentiating the delayed waveforms and the other of said cyclical waveforms, means for comparing each differentiated delayed waveform with the differentiated other cyclical waveform and producing a first pulse when zero amplitudes of the compared differentiated waveforms occur simultaneously and producing a second pulse when zero amplitude of the compared differentiated waveforms next occur simultaneously, means for differentiating each differentiated delayed waveform and said other cyclical waveform to produce second derivative waveforms, means for comparing the second derivative waveforms of said delayed waveforms and said other cyclical waveforms to produce a third pulse when zero amplitudes of the second derivative waveforms occur simultaneously, means for comparing the first, second, and third pulses for coincidence, means for generating a marking pulse each time said first, second, and third pulses occur simultaneously during a single cycle of said other cyclical waveform, and means for recording said other cyclical waveform and the marking pulses to produce said graphic representation of said terrain with said spaced contour lines outlined on said graphic representation.

12. In a photogrammetric apparatus, the combination according to claim 11 further comprising means for adjustably supporting said stereoscopic representations in a fixed orientation with respect to each other for scanning by said photoelectric means, the delay means for one of the cyclical waveforms comprising means for advancing one of said stereoscopic representations a predetermined distance with respect to the other stereoscopic representation, said distance being proportionate to the spacing between said contour lines.

13. The combination according to claim 12, wherein the means for advancing the one stereoscopic representation comprises an electromagnet operated plunger, said plunger having a hooked end, and gear means carried by the support for said stereoscopic representations, and repeatedly engageable by said hooked end of the plunger to advance the one stereoscopic representation each time one scan of the stereoscopic representations is completed.

14. In a photogrammetric apparatus for producing a graphic representation of a plurality of spaced contour lines, in combination: photoelectric means for simultaneously scanning two stereoscopic representations of a terrain to produce two cyclical waveforms, means for delaying one of said waveforms to produce a plurality of delayed waveforms, means for comparing the respective delayed waveforms with the other of said cyclical waveforms and producing a plurality of series of marking pulses, one of said marking pulses being produced each time successive points of minimum amplitude, inflection and maximum amplitude in one cycle of one delayed waveform and said other cyclical waveform are in coincidence, and means for recording said plurality of series of marking pulses automatically to produce said graphic representation of said plurality of spaced contour lines.

References Cited in the file of this patent

UNITED STATES PATENTS

| | | |
|---|---|---|
| 2,251,828 | Hammond | Aug. 5, 1941 |
| 2,269,594 | Mathes | Jan. 13, 1942 |
| 2,283,226 | Porter | May 19, 1942 |
| 2,426,225 | Krause | Aug. 26, 1947 |
| 2,635,184 | Cotsworth | Apr. 14, 1953 |
| 2,665,410 | Burbeck | Jan. 5, 1954 |
| 2,679,636 | Hillyer | May 25, 1954 |